(12) United States Patent
Westerlind et al.

(10) Patent No.: US 12,263,799 B2
(45) Date of Patent: Apr. 1, 2025

(54) VEHICLE POWER SUPPLY SYSTEM, VEHICLE COMPRISING SUCH SYSTEM AND METHOD FOR RECHARGING A VEHICLE BATTERY

(71) Applicant: VOLVO TRUCK CORPORATION, Gothenburg (SE)

(72) Inventors: Hans Westerlind, Nol (SE); Robert Niemczyk, Greensboro, NC (US); Gregoire Artur Du Plessis, Lyons (FR); Jean-Daniel Bonnet, High Point, NC (US); Bart Potts, Clemmons, NC (US); Joshua Smith, Sophia, NC (US); David De Brito, Charvieu (FR); Maxime Valero, Oullins (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 628 days.

(21) Appl. No.: 17/596,968

(22) PCT Filed: Jun. 26, 2019

(86) PCT No.: PCT/EP2019/067094
§ 371 (c)(1),
(2) Date: Dec. 22, 2021

(87) PCT Pub. No.: WO2020/259835
PCT Pub. Date: Dec. 30, 2020

(65) Prior Publication Data
US 2022/0242341 A1  Aug. 4, 2022

(51) Int. Cl.
*H02J 1/08* (2006.01)
*B60L 1/00* (2006.01)
(Continued)

(52) U.S. Cl.
CPC ............. *B60R 16/033* (2013.01); *B60L 1/00* (2013.01); *H02J 1/082* (2020.01); *H02J 7/1423* (2013.01); *H02M 3/003* (2021.05); *H02J 2310/46* (2020.01)

(58) Field of Classification Search
CPC ...... B60R 16/033; B60L 1/00; B60L 2210/10; B60L 53/14; B60L 53/20; H02J 1/082;
(Continued)

(56) References Cited

U.S. PATENT DOCUMENTS 10,369,900 B1 * 8/2019 Conlon ................... B60L 53/14
11,674,490 B2 * 6/2023 Clarke ................. H02J 7/0042
123/179.1

(Continued)

FOREIGN PATENT DOCUMENTS

| CN | 108233513 A | 6/2018 |
| CN | 108258906 A | 7/2018 |
| EP | 3018812 A1 | 5/2016 |

OTHER PUBLICATIONS

International Search Report and Written Opinion dated Dec. 11, 2019 in corresponding International PCT Application No. PCT/EP2019/067094, 14 pages.

*Primary Examiner* — Nghia M Doan
(74) *Attorney, Agent, or Firm* — Venable LLP; Jeffri A. Kaminski

(57) ABSTRACT

A vehicle power supply system (100), comprising: —a vehicle battery (111) with a charging voltage, —a DC-to-DC converter (130) comprising two first connection terminals (110) connected to the vehicle battery (111) and two second connection terminals (120) for connecting an external charger to recharge the vehicle battery (111) or for connecting an external battery to be recharged, wherein, in a first mode in which an external charger is connected to the two second connection terminals (120), the voltage V2 between the two second connection terminals (120) is an input voltage of the converter and the voltage V1 between the two first connection terminals (110) is an output voltage of the converter, (Continued)

wherein, in a second mode in which an external battery to be recharged is connected to the two second connection terminals (120), the voltage V1 between the two first connection terminals (110) is an input voltage of the converter and the voltage V2 between the two second connection terminals (120) is an output voltage of the converter, wherein the system also includes means for determining at least the voltage V2 between the two second connection terminals (120) and preferably also the voltage V1 between the two first connection terminals (110), and wherein the DC-to-DC converter (130) is controlled so that the output voltage of the converter is equal to the charging voltage of the vehicle battery (111) in the first mode and to a charging voltage of the external battery in the second mode.

17 Claims, 3 Drawing Sheets

(51) Int. Cl.
*B60R 16/033* (2006.01)
*H02J 7/14* (2006.01)
*H02M 3/00* (2006.01)

(58) Field of Classification Search
CPC .. H02J 7/1423; H02J 2310/46; H02J 7/00045; H02J 7/14; H02J 7/00047; H02J 7/00041; H02M 3/003; Y02T 10/70; Y02T 10/7072; Y02T 90/14
See application file for complete search history.

(56) References Cited

U.S. PATENT DOCUMENTS

| | | | |
|---|---|---|---|
| 11,787,297 B2* | 10/2023 | Nook | H02J 7/0047 320/105 |
| 2005/0151509 A1 | 7/2005 | Cook | |
| 2009/0314561 A1* | 12/2009 | Handa | F02N 11/0866 180/65.21 |
| 2011/0227540 A1* | 9/2011 | Kanoh | B60L 58/24 320/135 |

* cited by examiner

VEHICLE POWER SUPPLY SYSTEM, VEHICLE COMPRISING SUCH SYSTEM AND METHOD FOR RECHARGING A VEHICLE BATTERY

CROSS-REFERENCE TO RELATED APPLICATIONS

This application is a U.S. National Stage application of PCT/EP2019/067094, filed Jun. 26, 2019, and published on Dec. 30, 2020, as WO 2020/259835 A1, all of which is hereby incorporated by reference in its entirety.

TECHNICAL FIELD

The invention relates to a vehicle power supply system and to a vehicle comprising such system. The invention also relates to a method for recharging a vehicle battery, in particular using a truck as battery charger.

The invention can be applied to light, medium and heavy-duty vehicles, such as trucks, buses and construction equipment. Although the invention will be described with respect to a truck, the invention is not restricted to this particular vehicle, but may also be used in other vehicles, such as cars.

BACKGROUND

Currently, trucks in Europe are equipped with a 24 V power supply system, which generally includes two 12 V batteries connected in series. On the other hand, trucks in the USA are equipped with a 12 V power supply system. Accordingly, the charging voltage of the batteries of the trucks in the US is different from that of the trucks in Europe. Indeed, the charging voltage of a 12V battery, which is the voltage that needs to be applied between the two connection terminals of the battery to recharge it, is about 14.3V; while the charging voltage of a 24V battery is about 28.6V.

However, it is likely that trucks equipped with a 24V power supply system will be introduced in the US market, so that both types of trucks (12V and 24V) will coexist in the US.

Thus, a future need would be to be able to recharge a truck wired in 12V using a truck wired in 24V, and vice versa. However, we know that there is a risk of damaging the battery if the charging voltage applied to the battery terminals is too high or too low compared to the charging voltage provided by the manufacturers.

Therefore, the introduction of trucks equipped with a 24 V battery in the USA may be problematic.

Another problem is the difficulty to determine the nominal voltage of the battery of the truck to recharge, because the voltage of a full-charged 12V battery may be confused with a half-charged 24V battery.

SUMMARY OF THE INVENTION

The present invention provides a vehicle power supply system according to claim 1.

Advantageous features of the system are depicted in the claims 2 to 10.

The invention also concerns a vehicle according to claims 11 and 12.

Eventually, the invention relates to a method according to claim 13.

Advantageous features of the method are depicted in the claim 14 and following.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENT(S) OF THE INVENTION

Figure 1:
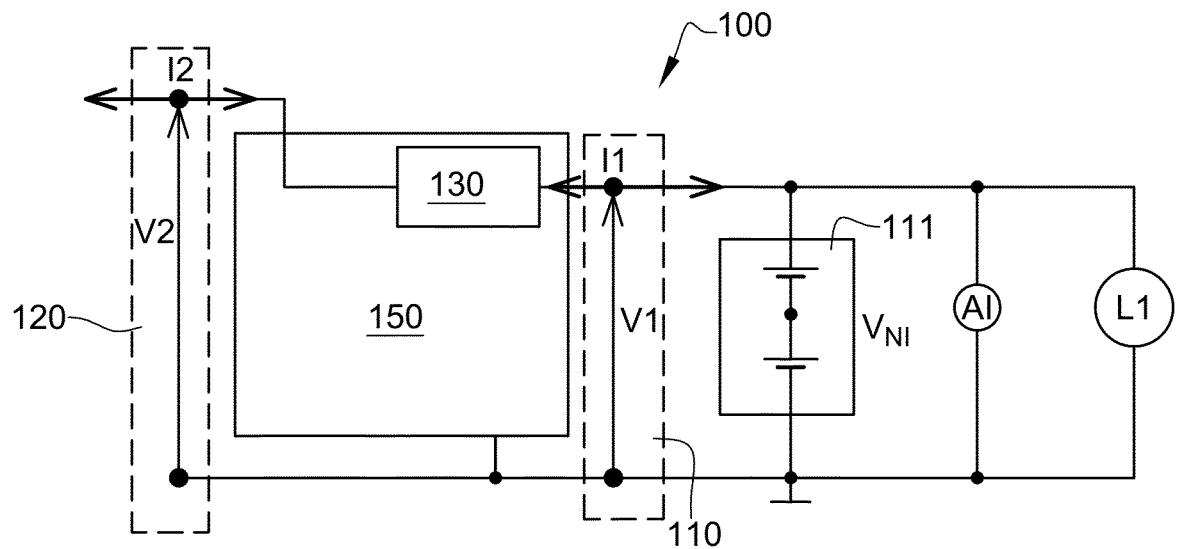
FIG. 1 is a schematic representation of a power supply system according to the invention.

FIG. 1 represents a vehicle power supply system 100 according to the invention. Typically, the system 100 is configured to be installed in a vehicle 1, in particular a heavy-duty vehicle such as a truck, a bus or a construction vehicle.

Figure 2:
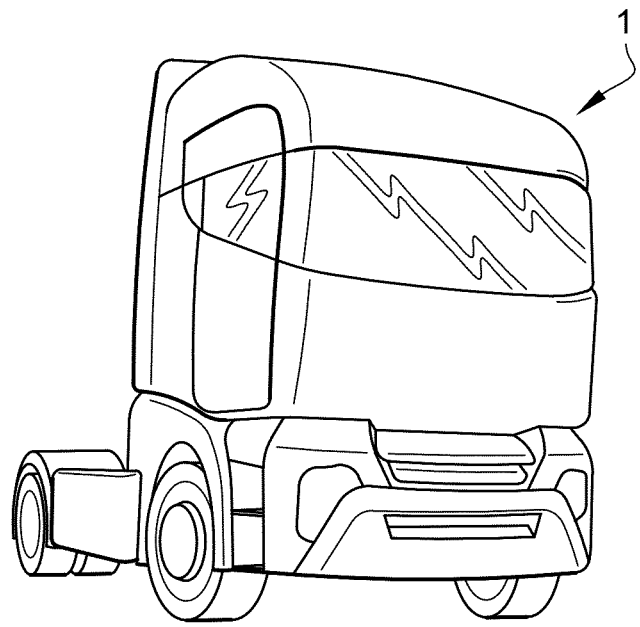
FIG. 2 is a representation of the type of vehicle for which the invention is designed.
Figure 3:
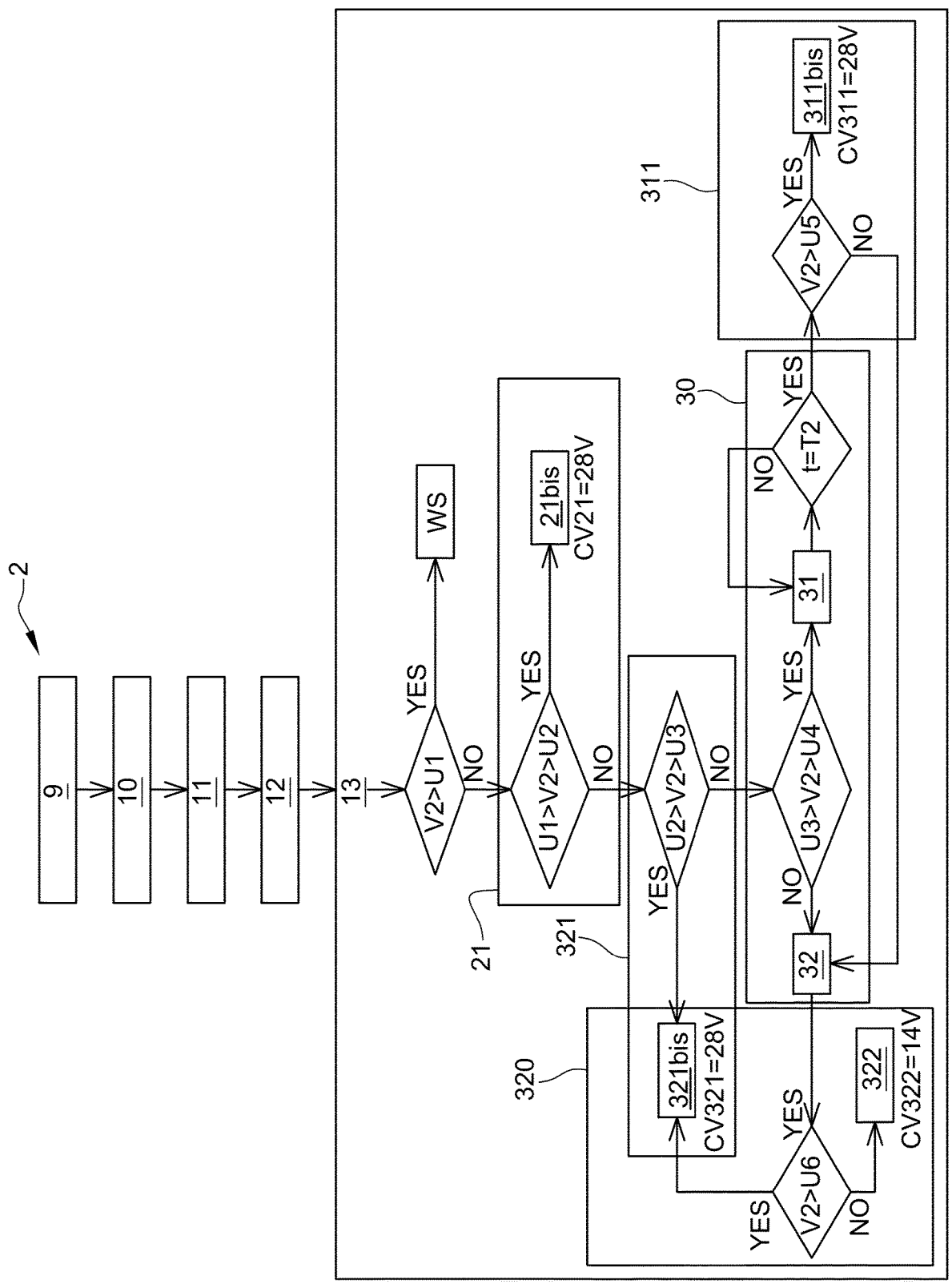
FIG. 3 is a block diagram illustrating a battery charging method according to the present invention.

By way of example, the truck 1 is illustrated on FIG. 2.

The system 100 can be considered as a spare part, meaning that it can be removed from the rest of the vehicle and replaced.

As illustrated in FIG. 1, the system 100 includes a DC-to-DC converter 130, a controller 150, and a battery pack 111.

The DC-to-DC converter 130 includes two first connection terminals that are represented, for the sake of the description, as a first connector 110 and two second connection terminals that are also represented, for the sake of the description, as a second connector 120.

The two connection terminals of the connector 110, as well as those of the connector 120, are respectively a phase connection terminal and a neutral connection terminal.

Preferably, the system 100 also includes an alternator A1. FIG. 1 shows that, when the system 100 is installed within a vehicle, it provides at least one electrical equipment L1 (or electrical load) of the vehicle with electric power.

The battery pack (or battery) 111 is provided for powering the starter and all other electrical equipment L1 of the truck when the Internal Combustion Engine (ICE) of the vehicle is off and the alternator A1 is provided for supplying the electrical components L1 of the vehicle when engine is running.

Also, the alternator A1 is configured to recharge, when required, the battery pack 111.

Preferably, the battery pack 111 is a 24V battery comprising two 12V batteries connected in series. This means that the battery pack 111 has a nominal voltage $V_{N1}$ of 24V.

Typically, the first battery of the pack 111, which is called "starting battery", is dedicated for starting purpose, i.e. for powering the starter of the vehicle, while the other battery, which is called the "living battery" is dedicated for powering all of the other electrical components of the vehicle.

One advantage is that the living battery can be used to power the starter of the vehicle if the "starting battery" is flat.

The first connector 110 is adapted to be electrically coupled to the battery pack 111, said battery pack 111 providing electrical energy to a load L1 when alternator A1 is off (engine not running).

The output connector 120 is adapted to be electrically coupled to an external apparatus, such as an external battery (of another vehicle) or an external charger (such as an alternator of another vehicle). Typically, the two connection terminals of the connector 120 are designed for being connected to alligator clips (not shown). Alligator clips enable connecting the power supply system 100 of the truck to the one of another vehicle, in particular to the one of another truck (not shown). Alligator clips are well known, that is why they are not further described.

Logically, if the external apparatus that is connected to the connection terminals 120 is an external battery, then it means that such battery needs to be recharged and that the vehicle to which it belongs needs assistance (i.e. that the vehicle is a disabled one).

Also, if the external apparatus that is connected to the connection terminals 120 is an external charger (such as an alternator), then it means that the battery 111 of the truck 1 needs to be recharged and that the vehicle 1 to which it belongs needs assistance (i.e. that the vehicle is a disabled one).

In practice, the actual voltage $V_1$ at the first connector 110 may differ from the nominal voltage of the battery pack 111, the difference depending on the actual state of charge of first the battery pack.

In the example, the converter 130 is electrically coupled to the first connector 110 and to the second connector 120. This converter 130, is a DC/DC reversible converter.

In a first mode in which an external charger (not shown) is connected to the two second connection terminals 120, the voltage V2 between the two second connection terminals 120 is an input voltage of the converter (i.e. a non-converted voltage) and the voltage V1 between the first two connection terminals 110 is an output voltage (i.e. a converted voltage) of the converter 130.

In a second mode in which an external battery (not shown) to be recharged is connected to the two connection terminals 120, the voltage V1 between the two first connection terminals 110 is an input voltage of the converter and the voltage V2 between the two second connection terminals 120 is an output voltage of the converter, The controller 150 is configured to communicate with the converter via data bus or via remote connecting means, so as to control the converter 130. The power supply system 100 comprises at least one means (or sensor) to measure the voltage $V_2$ between the two connection terminals 120.

Preferably, the system 100 includes a plurality of sensors, not represented on the figures, to measure the first and second voltage $V_1$, $V_2$.

Said sensors are configured to communicate with the controller 150, which is itself configured to control first and second voltage $V_1$, $V_2$ and current intensities delivered respectively at the first and the second connector 110, 120.

Typically, the system includes at least a voltmeter (not shown) to measure the voltage between the two second connection terminals 120.

In the first mode, there is no need to measure the voltage between the two first connection terminals 110 because it is set to the charging voltage of the battery 111, which is 28.6V.

In the second mode, there is also no need to measure the voltage between the two first connection terminals 110 because it is equal to the voltage of the alternator A1, which is about 28V.

The controller 150 is thus configured so that the power supply system 100 is configured to recharge an external battery or to have the battery pack 111 recharged by an external charger, depending on the type of apparatus (and its voltage) that is connected to the connection terminals 120.

Hereafter is described a method 2 for recharging a vehicle battery. The vehicle battery may be the one of the truck of FIG. 2, i.e. the battery pack 111, or the one of another vehicle. A first step of the method 2 is to provide 9 a vehicle comprising a power supply system 100 according to the description hereinabove. After having connected 10 the two second terminals 120 of the power supply system 100 to an external charger or to an external battery, to use 11 the DC-to-DC converter 130, a step 12 of the method is to measure the actual second voltage $V_2$ at the second connector 120, to control 13 the DC-to-DC converter 130.

If the voltage $V_2$ is greater than a first threshold U1, which may be set for example to 32 V, this means that the external apparatus is not suited for recharging the battery 111 because the voltage of it is too high. Typically, this occurs when the external apparatus belongs to a full electric vehicle.

Accordingly, a warning signal WS is preferably transmitted to the driver, for example through the on-board computer (not shown), in order to indicate that it will not be possible to operate any recharging operation.

If the measured voltage $V_2$ is lower than the first threshold U1 of 32V and higher than a second threshold U2, which may be set to 26 V, then it means that the external apparatus is probably a running alternator, whose output voltage is adapted for electrical components wired in 24V. In other words, this means that the vehicle to which belongs the external apparatus is likely a truck wired in 24V (European truck) and that the ICE of this truck is on.

Accordingly, the converter 130 enters the first mode described here-above, in which the objective is to recharge 21bis the battery pack 111.

With this respect, the first voltage $V_1$ is set by the converter 130 to a first charging voltage CV21 that precisely corresponds to the charging voltage of the battery pack 111, which is about 28.6V.

If the measured voltage $V_2$ is lower than the second threshold U2 of 26V and higher than a third threshold U3, which may be set to 16V, then it means the external apparatus that has been connected to the connection terminals 120 is likely an external battery, having a nominal voltage of 24V. The external battery probably belongs to a disabled vehicle, i.e. a vehicle whose ICE is off and cannot be started by the battery.

Accordingly, the converter 130 enters the second mode described here-above, in which the objective is to recharge 321bis the external battery (not shown).

With this respect, the second voltage $V_2$ is set by the converter 130 to a second charging voltage CV321 that precisely corresponds to the charging voltage of the external battery, which is about 28.6V because the nominal voltage of the external battery is 24V. It is worth noting that in this case, the ratio of the DC-to-DC converter 130 is 1:1 if the alternator of the truck 1 is running, because the two vehicles use the same voltage, which is 24V. Indeed, in this case, the first voltage $V_1$ corresponds to the output voltage of the alternator A1, which is about 28V.

If the second voltage $V_2$ is lower than the third threshold U3 of 16V and higher than a fourth threshold U4 that may be set to 13V, then the system 100 enters a step 31, during which it draws an electrical current CI from the external apparatus during a first period of time T1.

The aim of this step 31 is to determine whether the external apparatus is a running alternator (adapted to a power supply system of 12V) or a flat battery of 12 or 24V.

Figure 5:
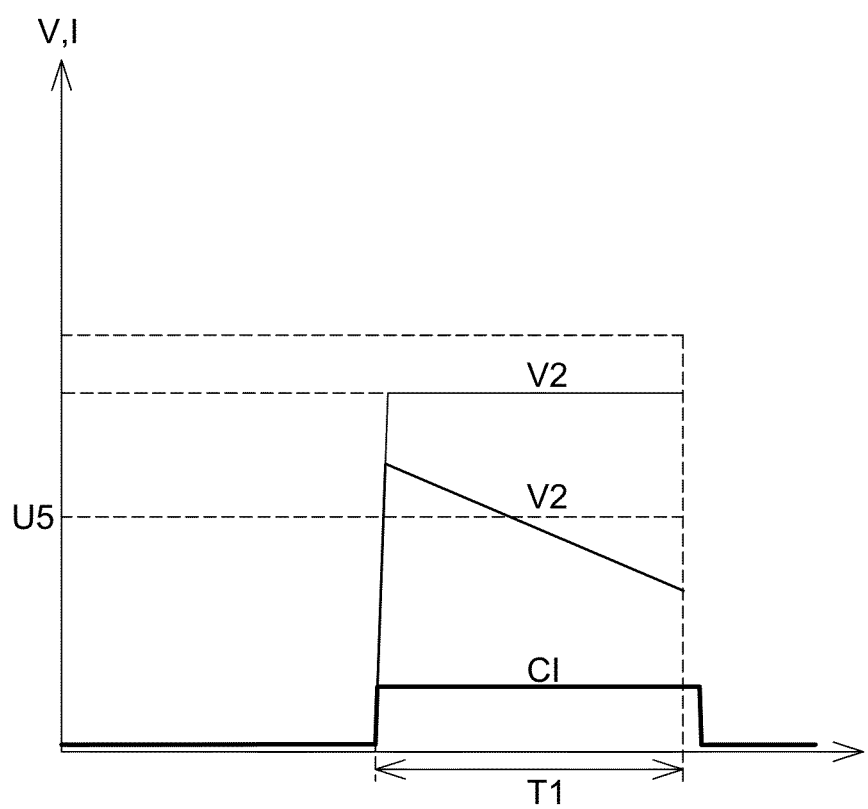
FIG. 5 is a graphical representation of the evolution of the voltage delivered by the assisted battery when discharged with a constant discharging intensity during a period of time.

As shown on FIG. 5, when the period of time T1 has elapsed, the voltage $V_2$ measured between the two connection terminals 120 is compared to a threshold voltage U5, which may be set to 14V.

If the voltage $V_2$ between the two connection terminals 120 has not fallen under the threshold voltage U5, i.e. if it is higher than U5 when the period of time T1 has elapsed, then it means that the external apparatus is not a battery, but a running alternator because the voltage of it did not decrease.

Precisely, said running alternator belongs to a vehicle wired in 12V (American truck) and delivers electrical power at a corresponding voltage, which is about 14.3V.

Therefore, the converter 130 enters the first mode, in which the aim is to recharge 311*bis* the battery pack 111.

With this respect, the first voltage $V_1$ is set to the charging voltage CV311 of the battery pack 111, which is about 28.6V. It is worth noting that, in this case, the ratio of the DC-to-DC converter 130 is 2:1, meaning that the output voltage of the converter 130 (which is about 28.6V) is two times higher than the input voltage (which is about 14.3V).

However, if the voltage $V_2$ between the two connection terminals 120 has fallen under the threshold voltage U5, i.e. if it is lower than U5 when the period of time T1 has elapsed, then it means that the external apparatus is a flat battery because the voltage of it has decreased. Indeed, the fact that the voltage $V_2$ between the two connection terminals 120 has decreased during the period of time T1 means that a phenomenon of battery discharge has occurred.

It is worth noting that the current intensity that is drawn during T1 is voluntarily set to a high level, to make sure that the measured voltage $V_2$ will significantly decrease if the external apparatus is a battery.

Even if we know that the external apparatus is a flat battery that needs to be recharged, we do not know, at this stage, whether this external battery has a nominal voltage of 12 V or 24 V. However, this information is important in order to set the correct/appropriate charging voltage. This is then the point of the next step.

Figure 4:
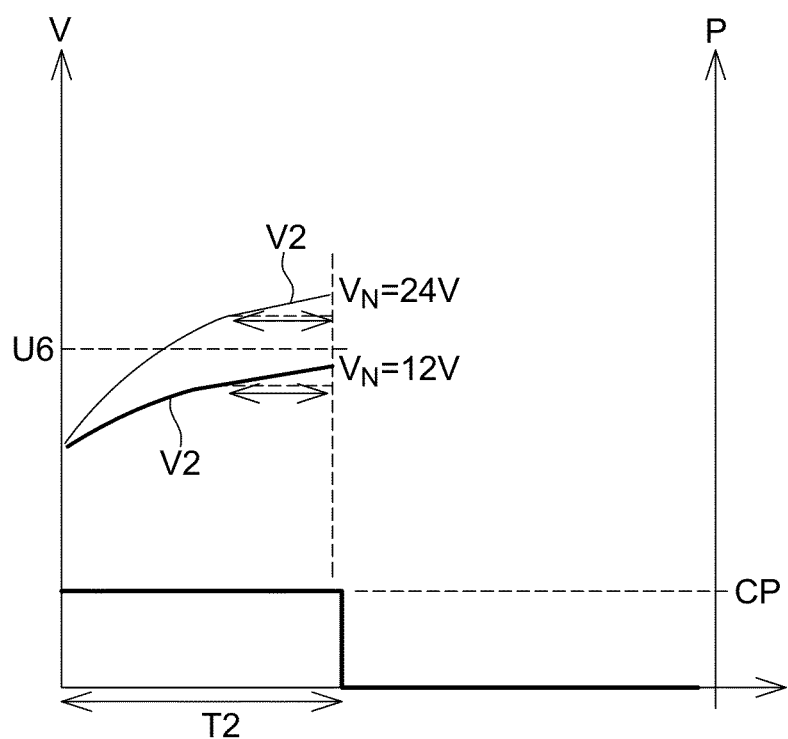
FIG. 4 is a graphical representation of the evolution of the voltage delivered by the assisted battery when charged with a constant charging intensity during a period of time.

During a next step 32, the power supply system 100 is first used as a charger, meaning that electrical power CP is sent by the system 100 to the external flat battery during a period of time T2 (See FIG. 4). Then, the voltage $V_2$ between the two connection terminals 120 is monitored.

As shown on FIG. 4, if when the period of time T2 has elapsed, the second voltage $V_2$ is greater than a certain voltage U6, which may be set to 14V, it can be inferred that the external battery pack is a 24 V nominal voltage that is discharged.

Accordingly, the converter 130 enters the second mode described here-above, in which the objective is to recharge 321*bis* the external battery (not shown).

With this respect, the second voltage $V_2$ is set by the converter 130 to the second charging voltage CV321 that precisely corresponds to the charging voltage of the external battery, which is about 28.6V because the nominal voltage of the external battery has been determined as being 24V. It is worth noting that, in this case, the ratio of the DC-to-DC converter 130 is 1:1 if the alternator of the truck 1 is running, because the two vehicles use the same voltage, which is 24V. Indeed, in this case, the first voltage $V_1$ corresponds to the output voltage of the alternator A1, which is about 28V.

However, if when the period of time T2 has elapsed, the second voltage $V_2$ is lower than said certain voltage U6 of 14V, it can be inferred that the external battery pack has a nominal voltage of 12V.

Thus, the second voltage $V_2$ is set to the charging voltage of a 12V battery, which is about 14.3V. It is worth noting that, in this case, the ratio of the DC-to-DC converter 130 is 1:2, meaning that the input voltage $V_1$ of the converter 130 (which is about 28.6V) is two times higher than the output voltage $V_2$ (which is about 14.3V).

It is to be understood that the present invention is not limited to the embodiments described above and illustrated in the drawings; rather, the skilled person will recognize that many changes and modifications may be made within the scope of the appended claims.

The invention claimed is:

1. A vehicle power supply system, comprising:
   a vehicle battery with a charging voltage,
   a DC-to-DC converter comprising two first connection terminals connected to the vehicle battery and two second connection terminals for connecting an external charger to recharge the vehicle battery or for connecting an external battery to be recharged,
   wherein, in a first mode in which an external charger is connected to the two second connection terminals, the voltage V2 between the two second connection terminals is an input voltage of the DC-to-DC converter and the voltage V1 between the two first connection terminals is an output voltage of the DC-to-DC converter,
   wherein, in a second mode in which an external battery to be recharged is connected to the two second connection terminals, the voltage V1 between the two first connection terminals is an input voltage of the DC-to-DC converter and the voltage V2 between the two second connection terminals is an output voltage of the DC-to-DC converter,
   wherein the system also includes a sensor for measuring the voltage V2 between the two second connection terminals, the measuring further comprising:
      determining that the voltage V2 is lower than a first threshold and higher than a second threshold,
      entering the first mode of the DC-to-DC converter to charge the vehicle battery,
      determining that the voltage V2 is lower than the second threshold and higher than a third threshold,
      entering the second mode of the DC-to-DC converter to charge the external battery, and
   wherein the DC-to-DC converter is controlled so that the output voltage of the converter is equal to the charging voltage of the vehicle battery in the first mode and to a charging voltage of the external battery in the second mode.

2. The vehicle power supply system of claim 1, wherein the vehicle battery has a nominal voltage of 24V, and the charging voltage of the vehicle battery comprised between 27 V and 29 V.

3. The vehicle power supply system of claim 1, further comprising an alternator and wherein, in the second mode, the voltage V1 between the two first connection terminals is equal to the voltage of the alternator.

4. The vehicle power supply system according to claim 2, wherein the vehicle battery, the DC-to-DC converter and the alternator are connected in parallel.

5. The vehicle power supply system of claim 1, wherein the vehicle battery is a battery pack including two batteries connected in series, each of the two batteries having a nominal voltage of 12 V.

6. The vehicle power supply system of claim 1, wherein, in the second mode, the output voltage is either comprised between 13 V and 15 V, or comprised between 27 V and 29 V.

7. The vehicle power supply system according to claim 1, wherein the two second connection terminals are designed for being connected to alligator clips.

8. The vehicle power supply system according to claim 1, wherein it further includes a controller for controlling the ratio of conversion of the DC-to-DC converter, depending on the input voltage of the converter.

9. The vehicle power supply system according to claim 1, wherein the ratio of conversion of the DC-to-DC converter is selected between 1:1, 1:2 and 2:1.

10. The vehicle power supply system according to claim 1, wherein the two first connection terminals, as well as the two second connection terminals, include a phase terminal and a neutral terminal.

11. A vehicle, comprising the power supply system according to claim 1.

12. A vehicle including electrical loads that are connected to the power supply system according to claim 1.

13. A method for recharging a vehicle battery, comprising steps consisting in:
a) providing a vehicle and providing the DC-to-DC converter according to claim 1,
b) connecting the two second connection terminals of the DC-to-DC converter to the external charger in order to recharge the vehicle battery in the first mode or to an external battery which needs to be recharged in the second mode,
c) measuring the voltage V2 between the two second connection terminals,
d) determining that the voltage V2 is lower than the first threshold and higher than the second threshold,
e) entering the first mode of the DC-to-DC converter to charge the vehicle battery,
f) determining that the voltage V2 is lower than the second threshold and higher than the third threshold,
g) entering the second mode of the DC-to-DC converter to charge the external battery, and
h) controlling the DC-to-DC converter so that the output voltage of the converter is equal to the charging voltage of the vehicle battery in the first mode and to a charging voltage of the external battery in the second mode.

14. A method according to claim 1, wherein, in the second mode, the method includes an additional step consisting in delivering a certain power to the external battery during a period of time and comparing the voltage of said external battery with a threshold value at the end of the period of time, in order to determine whether the external battery is a battery having a nominal voltage of 12 V or 24 V.

15. The method according to claim 13, including further steps for automatically determining, when an external apparatus is connected to the two second connection terminals, whether the external apparatus is the external charger configured to recharge the vehicle battery or an external battery to be recharged.

16. The method according to claim 15, wherein the external apparatus is determined as being the external charger if the voltage between the two second connection terminals is lower than the first threshold, and greater than the second threshold.

17. The method according to claim 15, wherein the method comprises an additional step in which the power supply system draws electrical power from the external apparatus during a certain period of time and wherein the external apparatus is determined as being the external charger if the voltage between the two second connection terminals is above a certain voltage, after said period of time has elapsed.

* * * * *